3,536,749

FLUOROCARBON-ACRYLATE PRODUCTS

James D. Groves, Hudson Township, St. Croix County, Wis., assignor to Minnesota Mining and Manufacturing Company, St. Paul, Minn., a corporation of Delaware No Drawing. Filed June 8, 1966, Ser. No. 555,965
Int. Cl. C07c *103/46, 143/74*
U.S. Cl. 260—481 4 Claims

ABSTRACT OF THE DISCLOSURE

Adducts are prepared by the reaction of fluorocarbon amides having at least one hydrogen atom bonded to amide nitrogen with an ester of acrylic acid or methacrylic acid. The adducts can be monomeric or they can be linear or crosslinked polymers, depending upon the functionality of the precursors and upon the relative amounts of the precursors which are reacted. Uses of the adducts include dielectric fluids, lubricants, release coatings and oil- and water-repellent coatings.

The present invention relates to a process of reacting fluorocarbon amides with acrylate-type esters, and to adducts obtained thereby.

It is an object of this invention to provide a novel method for the production of fluorocarbon group containing adducts.

It is another object of the invention to provide a method for the production of certain new fluorocarbon group-containing polymers.

It is another object of the invention to provide a novel class of fluorocarbon group-containing adducts.

It is still another object of the invention to provide certain novel oil- and water-repellent treating agents for substrates.

It is still another object of the invention to provide novel lubricants and lubricant additives.

It is a further object of the invention to provide a new class of reactive chemical compounds.

It is a still further object of the invention to provide durable oil- and water-repellent articles.

It is still another object of the invention to provide durable oil- and water-repellent fibers.

Various other objects of the invention will become apparent to those skilled in the art upon reading the following description and disclosure.

The process of the invention relates to the addition of a fluorocarbon amide to an ester of an acrylate-type acid (acrylic acid or methacrylic acid) and the recovery of the resulting adduct. Thus, according to the invention a fluorocarbon amide having a hydrogen atom bonded to the amide nitrogen (a primary or secondary amide) is added across the carbon-carbon double bond of an acrylate-type ester (i.e., the double bond in the acid portion of the ester) so that the hydrogen atom is bonded to one carbon atom adjacent the double bond, the remainder of the fluorocarbon amide is bonded to the other and the double bond is converted to a single (carbon-carbon) bond and the resulting adduct is recovered. As will be seen hereinafter, the fluorocarbon amide and the ester precursors can each be chosen so that they are capable of entering into one or more than one such unit reaction.

Ordinarily, but not invariably, the addition occurs in such a way that the amide hydrogen atom adds to the ethylenic carbon atom of the acrylate-type ester which is $\alpha$ to the ester group thereof and the remainder of the fluorocarbon amide adds to the ethylenic carbon atom which is $\beta$ to the ester group. For convenience, the addition will be referred to herein as occurring in this manner, although it is understood that the reverse addition is also contemplated (i.e., in which the hydrogen atom adds to the ethylenic carbon atom which is $\beta$ to the ester group and the remainder of the fluorocarbon amide adds to the ethylenic carbon atom which is $\alpha$ to the ester.

The fluorocarbon amides which are useful in the process of the invention include both monoamides and diamides and the individual functions can be either sulfonamides or carbonamides. In addition, the functions can be either primary amides (in which two hydrogen atoms are bonded to the amide nitrogen) or secondary amides (in which one hydrogen atom is bonded to the amide nitrogen). Among these compounds are the following:

$CF_3SO_2N(CH_3)H$
$C_8F_{17}SO_2NH_2$
$C_{14}F_{29}CON(C_3H_7)H$
$C_{24}F_{49}CON(CH_3)H$
$C_6F_{11}C_2F_4CONH_2$
$[H(C_2H_5)NOCC_2F_4]_2O$
$H_2NSO_2C_2F_4N(C_2F_4)_2NC_2F_4SO_2NH_2$

These compounds ordinarily contain between 1 and about 50 carbon atoms, normally not more than about 30 carbon atoms.

The fluorocarbon groups of the fluorocarbon amides can be a perfluoroalkyl group having an open (acyclic) straight- or branched-chain, or a cyclic structure (e.g., a perfluorocyclohexyl group having a 6-membered ring structure) or it can consist of a combination of perfluoroalkyl straight chain and perfluorocyclic groups. The fluorocarbon group may be bonded to the remainder of the molecule through either a cyclic or an acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure. A minor percentage of the fluorine atoms in the fluorocarbon groups (preferably not more than about 20 percent thereof) can also be replaced by such other atoms as hydrogen, chlorine, bromine, etc.

The acrylate-type ester precursors of the present invention include monoesters, diesters and polyesters, such as methylacrylate, ethyl methacrylate, octyl methacrylate, decylacrylate, octadecylmethacrylate, ethylene glycol diacrylate, tetrapropylene glycol dimethacrylate, pentaerythritol tetramethacrylate, etc. Ordinarily, these esters contain not more than about 22 carbon atoms although they can contain as many as 40 or more carbon atoms. They can also contain as few as 4 carbon atoms.

The fluorocarbon amide precursors can be mono-, di- or poly-functional with respect to the unit reaction with an ethylenic double bond of the acrylate-type esters, the functionality depending upon the number of hydrogen atoms bonded to amide nitrogen atoms therein. Thus, for example, a mono-secondary amide is mono-functional, a mono-primary amide or a di-secondary amide is difunctional, a diamide having one primary amide function and one secondary amide function is trifunctional, a di-primary amide is tetrafunctional, etc. The monoacrylate-type esters are mono-functional, the di-esters are difunctional, the tri-esters are trifunctional, the tetrafunctional esters are tetrafunctional, etc., with respect to the unit reaction.

Any of the foregoing types of fluorocarbon amides can be reacted with any of the types of acrylate-type esters to form the adducts of the invention and, depending upon the stoichiometry of the two reactants in the reaction mixture, one or more or all of the functions of any reactant can be utilized. Thus, if equimolar amounts of a mono-secondary fluorocarbon amide and a monoester are reacted, a 1:1 adduct is formed which contains no reactive amide hydrogen or ethylenic unsaturation $\alpha\beta$ to the acrylate-type ester group.

If equimolar amounts of a mono-secondary fluorocarbon amide and a diester are reacted, the resulting 1:1 adduct has a single reactive carbon-carbon double bond, etc. Further, it will be seen that linear and crosslinked polymers and compounds comprising varying ratios of fluorocarbon amides to acrylate-type esters derived units are included among the adducts of the invention.

A preferred class of the adducts of the invention are compounds which have the formula:

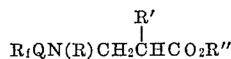

wherein $R_f$ is a fluorocarbon group of not more than about 25 carbon atoms, Q is —CO— or —$SO_2$—, R' is hydrogen or methyl, R'' is an alkyl group containing up to about 18 carbon atoms and R is hydrogen, an alkyl group containing up to about six carbon atoms or —$CH_2$—C(R')$HCO_2R''$. Particularly preferred among these compounds are those in which $R_f$ is a perfluoroalkyl group containing from about 3 to 18 carbon atoms.

The process of the invention is normally carried out in the presence of a highly basic catalyst such, for example, as benzyltrimethyl ammonium hydroxide, a tertiary aliphatic amine, and/or a heterocyclic amine, e.g., triethylamine or pyridine. An inert solvent, particularly one which will dissolve the fluorocarbon amide at the temperature of reaction, can also be added to the reaction mixture if desired. Among the solvents which are useful are lower aliphatic ethers, such as diethyl ether and the dimethylether of tetraethylene glycol, aromatic hydrocarbons, such as benzene, toluene and xylene and alcohols, such as methanol and ethanol.

The reaction is normally run at a temperature above about 50° C. and is preferably in the range of from about 80 to 150° C. or at the reflux temperature of the mixture. It is sometimes advantageous to carry out the reaction in a pressure vessel in order to raise the reaction temperature still higher without danger of losing all or a part of the reaction mixture, particularly when especially volatile solvents or reactants are used. At the end of the reaction, the desired adduct can be removed by various known techniques, such as crystallization, distillation (especially vacuum distillation), etc. The catalysts are often neutralized with a strong inorganic acid at the end of the reaction. They are generally water soluble and can be easily removed from the remainder of the reaction mixture if desired.

The adducts of the invention vary from liquids to lower melting solids and polymers. Those in which reactive groups remain are valuable intermediates for further reactions, e.g., they can be further reacted to form adducts of the invention which contain no active groups. The adducts of the invention which have no reactive groups have various uses as follows: The liquids are generally useful as dielectric fluids and heat transfer media. They are also highly polar and therefore tend to adsorb on metal surfaces and function well as lubricants. The monomeric solids form release coatings, are useful as components in solid lubricant mixtures and some can be used as oil- and water-repellent coatings. The polymers provide barrier laminants and oil- and water-repellent coatings. The adducts which are used for oil- and water-repellent coatings (e.g., on fibrous and porous surfaces such as woven fabrics or cloth, random web materials including felt and paper, wood, leather, fur, asbestos, ceramics, cast polymers, etc.) are preferably those which have perfluorinated groups containing at least 3 and normally not more than about 18 fully fluorinated carbon atoms, such as perfluoroalkyl groups. Adducts to be used in lubrication applications need contain only trifluoromethyl groups, although larger fluorochemical groups are preferred.

The following examples are offered to furnish a better understanding of the present invention and are not to be construed as in any way limiting thereof. All percentages are by weight unless otherwise specified.

EXAMPLE 1

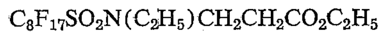

About 50.0 g. (0.095 m.) of $C_8F_{17}SO_2N(C_2H_5)H$, 20 g. (0.2 m.) of $CH_2{=}CHCO_2C_2H_5$ and 5 g. of a 40% methanolic solution of benzyltrimethyl ammonium hydroxide were heated to 80–85° C. on a steam bath for three hours. The mixture was taken up in diethyl ether and washed with 5% hydrochloric acid. After separation, the organic phase was dried over $MgSO_4$. Vacuum distillation gave 52.8 g. (88.7% yield) of a colorless oil; B.P. 120–124° C.; 0.25 mm. Hg.

*Analysis.*—Calc'd for $C_{15}C_{17}H_{14}NSO_2$ (percent): C, 28.7; F, 51.4; H, 2.24. Found (percent): C, 28.3; F, 52.4; H, 2.3.

EXAMPLE 2

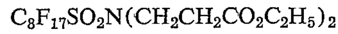

About 10 g. (0.02 m.) of $C_8F_{17}SO_2NH_2$, 20 g. (0.2 m.) of $CH_2{=}CHCO_2C_2H_5$ and 10 drops of triethylamine were heated for 10 hours at 75–80° C. on a steam bath. The mixture was taken up with diethylether, washed with 10% hydrochloric acid and dried over $MgSO_4$. Solvent removal and four recrystallizations from heptane gave 8.1 g. of a compound, M.P. 48–51° C. The infrared spectrum of this material showed no absorption in the 3.0$\mu$ region thus indicating an absence of amido hydrogen and supporting the foregoing structure.

*Analysis.*—Calc'd for $C_{18}F_{17}H_{18}SNO_6$ (percent): C, 30.9; H, 2.57. Found (percent): C, 30.5; H, 2.6.

EXAMPLE 3

$C_5F_{11}CONHCH_2CH_2CO_2C_2H_5$

A mixture of 15.7 g. (0.05 m.) of $C_5F_{11}CONH_2$, 10.0 g. (0.1 m.) of $CH_2{=}CHCO_2C_2H_5$ and 5 g. of benzyltrimethyl ammonium hydroxide (40% methanolic solution) was heated at 70–80° C. on a steam bath for ten hours. The reaction mixture was taken up in ether, washed with 10% hydrochloric acid and dried. The solvent was removed leaving 3.3 g. of a liquid distillate, B.P. 90–95° C. (1 mm. Hg). The infrared spectrum of this material showed absorption in the 3.0$\mu$ region and in the 5.8$\mu$ region indicating the presence of amide hydrogen and carbonyl respectively, thus supporting the foregoing structure.

*Analysis.*—Calc'd for $C_{11}F_{11}H_{10}NO_3$ (percent): C, 32.0; F, 48.6. Found (percent): C, 31.3; F, 51.6.

What is claimed is:

1. An adduct of the formula:

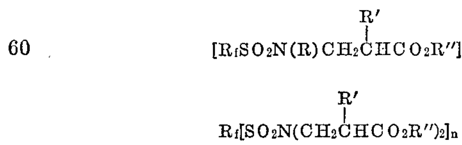

wherein $R_f$ is a perfluoroalkyl group containing from 3 to 18 carbon atoms R' is hydrogen or methyl, R'' is an alkyl group containing up to 18 carbon atoms and $n$ is 1 or 2.

2. An adduct of the formula:

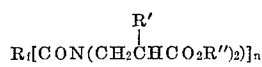

wherein $R_f$ is a perfluoroalkyl group containing from 3 to 18 carbon atoms, R' is hydrogen or methyl, R'' is an alkyl group containing up to 18 carbon atoms and *n* is 1 or 2.

3. An adduct of the formula:

$$R_fSO_2N(CH_2\overset{\displaystyle R'}{\overset{|}{C}}HCO_2R'')_2$$

wherein $R_f$ is a perfluoroalkyl group containing from 3 to 18 carbon atoms, R′ is hydrogen or methyl and R″ is an alkyl group containing up to 18 carbon atoms.

4. The adduct of the formula:

$$C_8F_{17}SO_2N(CH_2CH_2CO_2C_2H_5)_2$$

References Cited

FOREIGN PATENTS 960,622 6/1964 Great Britain.

OTHER REFERENCES

Migrdichian: Org. Synth., vol. 2, p. 881.

LORRAINE A. WEINBERGER, Primary Examiner

E. J. GLEIMAN, Assistant Examiner

U.S. Cl. X.R.

260—482, 556, 561

UNITED STATES PATENT OFFICE

CERTIFICATE OF CORRECTION

Patent No. 3,536,749 Dated October 27, 1970

Inventor(s) James D. Groves

It is certified that error appears in the above-identified patent and that said Letters Patent are hereby corrected as shown below:

Claim 1, the first formula (appearing at Column 4, line 60) should be removed

Signed and sealed this 18th day of May 1971.

(SEAL)
Attest:

EDWARD M.FIETCHER,JR.
Attesting Officer

WILLIAM E. SCHUYLER, JR.
Commissioner of Patents